US010023221B2

(12) United States Patent
Obayashi et al.

(10) Patent No.: US 10,023,221 B2
(45) Date of Patent: Jul. 17, 2018

(54) STEERING WHEEL STRUCTURE

(71) Applicant: HONDA MOTOR CO., LTD., Tokyo (JP)

(72) Inventors: Yuya Obayashi, Wako (JP); Eisuke Kurata, Wako (JP); Takashi Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 15/106,869

(22) PCT Filed: Oct. 1, 2014

(86) PCT No.: PCT/JP2014/076297
§ 371 (c)(1),
(2) Date: Jun. 21, 2016

(87) PCT Pub. No.: WO2015/098224
PCT Pub. Date: Jul. 2, 2015

(65) Prior Publication Data
US 2017/0036687 A1 Feb. 9, 2017

(30) Foreign Application Priority Data
Dec. 27, 2013 (JP) ................................. 2013-271545

(51) Int. Cl.
*B62D 1/04* (2006.01)
*B60R 21/203* (2006.01)
(Continued)

(52) U.S. Cl.
CPC ............... *B62D 1/04* (2013.01); *B60Q 5/003* (2013.01); *B60R 21/2037* (2013.01);
(Continued)

(58) Field of Classification Search
CPC ........ B60R 21/2037; B60R 2021/0004; B60R 2021/0032; B62D 1/04; B60Q 5/003
See application file for complete search history.

(56) References Cited

U.S. PATENT DOCUMENTS 5,350,190 A * 9/1994 Szigethy ................ B60Q 5/003
200/61.55
5,380,037 A * 1/1995 Worrell .................. B60Q 5/003
200/61.55
(Continued)

FOREIGN PATENT DOCUMENTS

CN 202294931 U 7/2012
JP 2009-202859 A 9/2009
(Continued)

OTHER PUBLICATIONS

International Search Report dated Dec. 22, 2014, issued in International Application No. PCT/JP2014/076297, with English translation (4 pages).
(Continued)

*Primary Examiner* — Paul N Dickson
*Assistant Examiner* — Timothy Wilhelm
(74) *Attorney, Agent, or Firm* — Westerman, Hattori, Daniels & Adrian, LLP

(57) ABSTRACT

This steering wheel structure has: a steering wheel main unit; a horn block; a support block; horn contacts; and a horn spring, wherein the support block has: a lock member; and an elastic body, wherein a load bypass member is provided that transmits an operation load in a push-in direction, which has been applied to the horn block, to the lock member while circumventing the elastic body, and wherein the load bypass member is configured so as to be in a non-contact state between itself and at least either of the horn block side and the lock member side when the horn block is in a vicinity of a default position, and so as to be brought into contact with
(Continued)

the horn block side and the lock member side in a manner capable of transmitting a load when the horn block is pushed in by a predetermined amount or greater.

10 Claims, 8 Drawing Sheets

(51) Int. Cl.
  *B60Q 5/00*    (2006.01)
  *B62D 7/22*    (2006.01)
  *B60R 21/00*   (2006.01)

(52) U.S. Cl.
  CPC ...... *B62D 7/222* (2013.01); *B60R 2021/0004* (2013.01); *B60R 2021/0032* (2013.01)

(56) References Cited

U.S. PATENT DOCUMENTS

| | | | | |
|---|---|---|---|---|
| 5,775,725 | A * | 7/1998 | Hodac | B60Q 5/003 280/728.2 |
| 6,257,615 | B1 * | 7/2001 | Bohn | B60Q 5/003 200/61.54 |
| 6,995,328 | B2 * | 2/2006 | Sugimoto | B60Q 5/003 200/61.54 |
| 8,256,797 | B2 * | 9/2012 | Sakurai | B60R 21/2037 200/61.55 |
| 8,286,766 | B2 * | 10/2012 | Terada | B60R 21/2037 188/379 |
| 8,342,567 | B2 * | 1/2013 | Sasaki | B60R 21/2037 200/61.55 |
| 8,556,292 | B2 * | 10/2013 | Umemura | B62D 7/222 280/731 |
| 8,794,662 | B2 * | 8/2014 | Ishii | B60R 21/2037 280/728.2 |
| 8,919,812 | B2 * | 12/2014 | Schutz | B60R 21/2037 280/728.2 |
| 8,985,623 | B2 * | 3/2015 | Kondo | B60R 21/2037 280/731 |
| 9,120,453 | B2 * | 9/2015 | Obayashi | B62D 7/222 |
| 9,156,400 | B2 * | 10/2015 | Ishii | B60Q 5/003 |
| 9,195,257 | B2 * | 11/2015 | Miyahara | B60R 21/2037 |
| 9,598,038 | B2 * | 3/2017 | Banno | B60R 21/21656 |
| 9,731,747 | B2 * | 8/2017 | Obayashi | B62D 1/04 |
| 2009/0218739 | A1 | 9/2009 | Terada et al. | |
| 2010/0219621 | A1 * | 9/2010 | Sasaki | B60Q 5/003 280/731 |
| 2013/0076011 | A1 | 3/2013 | Umemura et al. | |
| 2013/0221641 | A1 | 8/2013 | Kondo et al. | |
| 2014/0306432 | A1 | 10/2014 | Obayashi et al. | |

FOREIGN PATENT DOCUMENTS

| | | |
|---|---|---|
| JP | 2012-158236 A | 8/2012 |
| JP | 2013-71626 A | 4/2013 |
| WO | 2012/032860 A1 | 3/2012 |
| WO | 2013/077215 A1 | 5/2013 |

OTHER PUBLICATIONS

Office Action dated Apr. 19, 2017, issued in counterpart Chinese Application No. 201480070210.6, with partial English translation. (7 pages).

* cited by examiner

STEERING WHEEL STRUCTURE

TECHNICAL FIELD

The present invention relates to a steering wheel structure in which an airbag module is assembled integrally with a horn operation portion.

The present application claims priority based on Japanese Patent Application No. 2013-271545 filed on Dec. 27, 2013, the contents of which are incorporated herein by reference.

BACKGROUND ART

In many of the airbag apparatuses that are installed on the side of the driver's seat, an airbag module is assembled integrally with an interior side of the horn operation portion of the steering wheel. In this case, a horn block in which the horn operation portion and the airbag module are integrally assembled, is attached to a steering wheel main unit, which is supported by a steering shaft, by means of attachment pins.

As a structure of the steering wheel of this type, there is known a structure in which a rubber elastic body is interposed in a part of the attachment pin and in which the horn block and the rubber elastic body are used to form a dynamic damper for suppressing a vibration of the steering wheel (for example, see Patent Document 1).

In the steering wheel structure described in Patent Document 1, an attachment pin includes: a first pin block that is locked on a horn block side; a second pin block that is locked on a steering wheel main unit side; and a rubber elastic body that connects between the first pin block and the second pin block, wherein the second pin block is configured to be capable of displacing in an axial direction with respect to the steering wheel main unit by a predetermined stroke. Between the steering wheel main unit and the horn block, there are provided horn contacts that activate the horn when the horn block is pushed in by a set stroke or longer. Between the steering wheel main unit and the second pin block, there is interposed a horn spring that biases the horn block toward a default position.

In the steering wheel that adopts this structure, when a vibration such as an engine vibration or a travelling vibration is input to the steering wheel, the mass of the horn block and the rubber elastic body of the attachment pin function as a damper mass and a spring of a dynamic damper, to thereby suppress an input vibration through resonance of the horn block. Furthermore, when the horn block is pushed in in a steering wheel main unit direction, the attachment pin moves in its stroke in the axial direction with the compressive deformation of the horn spring. Subsequently, at the time when the horn block is pushed in by the set stroke or longer, the horn is activated through contact between the horn contacts.

RELATED ART DOCUMENT

Patent Document

Patent Document 1: PCT International Patent Publication No. WO 2013/077215

SUMMARY

Problems to be Solved by the Invention

However, in the steering wheel structure described in Patent Document 1, when the horn block is pushed in at the time of a horn operation, a load that has been input from the horn block to the first pin block of the attachment pin is input to the second pin block via the rubber elastic body. As a result, while the second pin block is compressively deforming the horn spring, the whole of the horn block is deformed in the push-in direction. In the case of this steering wheel structure, at the time of a horn operation, an operation load is input to the horn spring via the rubber elastic body. Therefore, when the operability of the horn and the durability of the rubber elastic body are taken into consideration, it is difficult to set the rigidity of the rubber elastic body to a given level or lower. Therefore, in actuality, as a dynamic damper, it is difficult to tune the vibration suppression.

Aspects of the present invention provide a steering wheel structure that makes it possible to set a rigidity of an elastic body low enough while maintaining the operability of the horn and the durability of the elastic body, to thereby make it possible to enhance a vibration suppression effect with ease.

Means for Solving the Problem

To solve the above problem, the steering wheel structure according to the present invention has adopted the following.

(1) A steering wheel structure according to an aspect of the present invention includes: a steering wheel main unit that is supported by a steering shaft; a horn block made of a horn operation portion and an airbag module being assembled together; a support block that causes the horn block to be supported by the steering wheel main unit; horn contacts that activate a horn when the horn block is pushed in by a set stroke or longer; and a horn spring that biases the horn block toward a default position, the support block having: a lock member that is locked on the steering wheel main unit side; and an elastic body that is interposed between the lock member and the horn block so as to connect the horn block to the lock member in an elastically deformable manner, and the horn spring being interposed between the steering wheel main unit and the lock member, wherein a load bypass member is provided that transmits an operation load in a push-in direction, which has been applied to the horn block, to the lock member while circumventing the elastic body, and wherein the load bypass member is configured so as to be in a non-contact state between itself and at least either of the horn block side and the lock member side when the horn block is in a vicinity of the default position, and so as to be brought into contact with the horn block side and the lock member side in a manner capable of transmitting a load when the horn block is pushed in by a predetermined amount or greater.

In the case of the present invention, while the horn block is not pushed in, the load bypass member is in a non-contact state between the horn block side and the lock member side, and the horn block is supported in an elastically deformable manner via the elastic body of the support block. In this condition, when a vibration such as an engine vibration or a travelling vibration is input to the steering wheel, a vibration system with the horn block as a damper mass and the elastic body as a spring resonates, which suppresses a vibration of the steering wheel. Furthermore, when the horn block is pushed in, the rubber elastic body of the support block is slightly compressed. Then, when an amount of the push-in of the horn block comes to be a predetermined amount or greater, the load bypass member is brought into contact with the horn block side and the lock member side in a manner capable of transmitting a load. In this condition, when the horn block is further pushed in, a load is input to the lock member of the support block via the load bypass member, and the lock member displaces in the steering wheel main unit direction while compressing and deforming the horn spring. As a result, at the time when the horn block is pushed in by a set stroke or longer, the horn contacts are brought into contact with each other to activate the horn.

(2) In the steering wheel structure as set forth above in (1), the support block may have: a first pin block that is locked on the horn block side; a second pin block as the lock member that is locked on the steering wheel main unit side; and the elastic body that connects between the first pin block and the second pin block in an elastically deformable manner, and the load bypass member may have: a lock fixation portion that is fixed to the second pin block; and a surrounding wall that surrounds a circumferential area between the elastic body and the first pin block, an end surface of the surrounding wall being brought into abutment with the horn block side when the horn block is pushed in by a predetermined amount or greater.

With this structure, if with the elastic deformation of the elastic body, the first pin block is to displace excessively in the radial direction with respect to the second pin block, then the first pin block is brought into abutment with the surrounding wall of the load bypass member, which restricts a displacement of the first pin block. As a result, a decrease in the operability of the horn block is suppressed, and also a deterioration of the elastic body is prevented.

(3) In the steering wheel structure as set forth above in (2), an end surface of the surrounding wall that is brought into abutment with the horn block side may be an annular flat surface.

With this structure, when an operation load is input to the horn block, the horn block is brought into abutment with the annular flat surface of the surrounding wall. This allows the load to be transmitted from the horn block to the load bypass member substantially uniformly in the circumferential direction.

(4) In the steering wheel structure as set forth above in (2) or (3), the load bypass member may be provided with a spring lock portion to which a first end side of the horn spring is attached.

With this structure, the lock fixation portion of the load bypass member is fixed to the second pin block, and the horn spring is previously attached to the spring lock portion of the load bypass member, and in this condition, it is possible to assemble the attachment pin with the steering wheel main unit with ease.

(5) In the steering wheel structure as set forth above in (4), an end portion of the first pin block that is on an opposite side to a connection portion to the elastic body may be joined integrally to the horn block side, and an end portion of the second pin block that is on an opposite side to a connection portion to the elastic body may be locked on the steering wheel main unit side by a snap-fit structure while a second end side of the horn spring is in abutment with the steering wheel main unit side.

In this case, when the horn block is assembled, the lock fixation portion of the load bypass member is fixed to the second pin block, the horn spring is attached to the spring lock portion of the load bypass member, and the first pin block is previously attached to the horn block side. In this condition, the horn block is set onto a predetermined attachment position of the steering wheel main unit. In this condition, an end portion of the second pin block of the support block is locked on the steering wheel main unit by the snap-fit structure.

(6) In the steering wheel structure as set forth above (1), the support block may have: an attachment pin as the lock member that is locked on the steering wheel main unit side; and the elastic body that connects between the horn block side and the attachment pin in an elastically deformable manner, and the load bypass member may have a protrusion portion that is provided protrudingly on the horn block side and is abuttable with an abutment seat on the attachment pin side, the protrusion portion on the horn block side being brought into abutment with the abutment seat on the attachment pin side when the horn block is pushed in by a predetermined amount or greater.

With this structure, while the horn block is not pushed in, the horn block is supported by the attachment pin in an elastically deformable manner via the elastic body. When the horn block is pushed in by a predetermined amount or greater, the protrusion portion on the horn block side is brought into abutment with the abutment seat on the attachment pin side, to thereby allow a load to be transmitted to the attachment pin while circumventing the elastic body. Therefore, although the structure is simple, it is possible to suppress a decrease in the operability of the horn and in the durability of the elastic body even if the rigidity of the elastic body is set low.

(7) In the steering wheel structure as set forth above in (6), the load bypass member may have, in an interior thereof, a barrel portion to which the elastic body is joined, and also an end portion of the barrel portion on the steering wheel main unit side may be the protrusion portion that is abuttable with the abutment seat on the attachment pin side, and an end portion of the attachment pin that is locked on the steering wheel main unit side may be joined to the elastic body.

With this structure, if with an elastic deformation of the elastic body, the horn block is to displace excessively in the radial direction with respect to the attachment pin, then the deformation of the elastic body is restricted by the barrel portion of the load bypass member, to thereby restrict the deformation of the horn block in the radial direction. As a result, a decrease in the operability of the horn block is suppressed, and also a deterioration in the elastic body is prevented. Furthermore, in the case of this structure, it will only suffice to provide the attachment pin side with an abutment seat that is abuttable with an end portion of the barrel portion of the load bypass member. Therefore, it is possible to simplify the structure on the attachment pin side. Furthermore, when the deformation of the horn block in the radial direction is restricted, the attachment pin will not be brought into direct abutment with the barrel portion only through restriction on the deformation of the elastic body by the barrel portion. Therefore, it is possible to prevent an abutting noise from being produced.

(8) In the steering wheel structure as set forth above in (6) or (7), the abutment seat may be provided with a spring lock portion to which a first end side of the horn spring is attached.

With this structure, at the time of assembling the horn block to the steering wheel main unit, it is possible to previously attach the horn spring to the abutment seat of the attachment pin. Therefore, an operation of assembling the horn block is made easy.

Advantage of the Invention

According to the aspects of the present invention, there is provided a load bypass member that transmits an operation load in the push-in direction, which has been applied to the horn block, to the lock member of the support block while circumventing the elastic body. The load bypass member is configured so as to be in a non-contact state between itself and at least either of the horn block side and the lock member side when the horn block is in the vicinity of a default position, and so as to be brought into contact with the horn block side and the lock member side in a manner capable of transmitting a load when the horn block is pushed in by a predetermined amount or greater. Therefore, at the time of a horn operation, an excessive load ceases to act on the elastic body of the support block. As a result, even if the rigidity of the elastic body of the support block is set sufficiently low, it is possible to suppress a decrease in the operability of the horn and in the durability of the elastic body.

Therefore, according to the present invention, it is possible to enhance a vibration suppression effect with ease while maintaining the operability of the horn and the durability of the elastic body.

DESCRIPTION OF THE EMBODIMENTS

Hereunder is a description of an embodiment of the present invention, based on the drawings.

Figure 1:
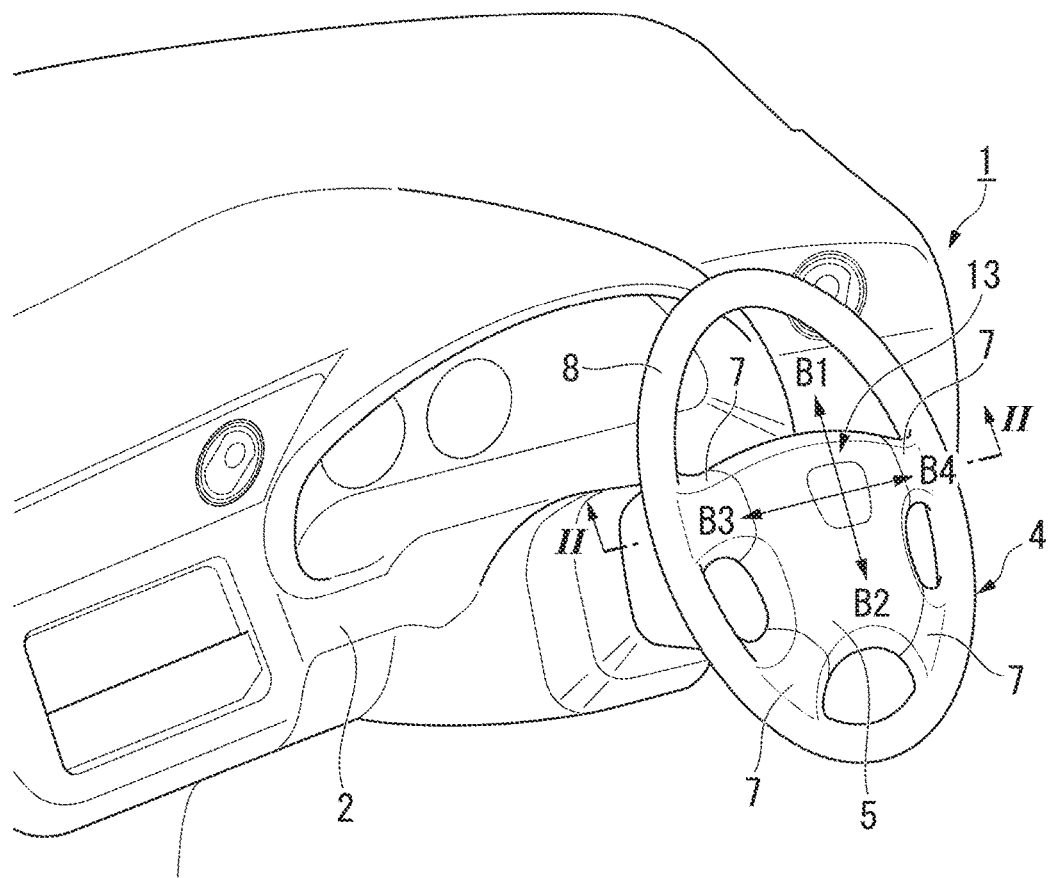
FIG. 1 is a perspective view showing an interior of a vehicle according to an embodiment of the present invention.
Figure 2:
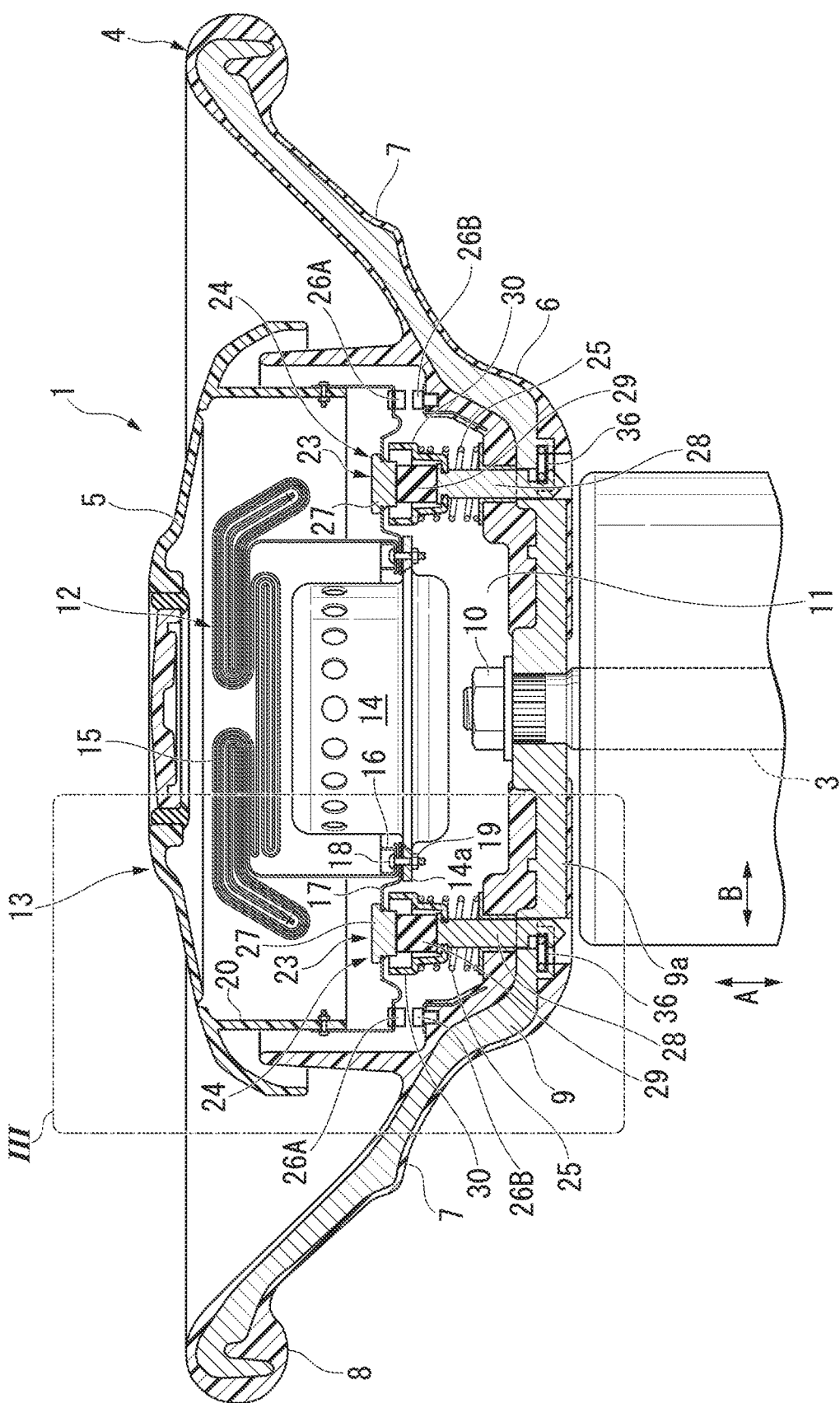
FIG. 2 is a cross-sectional view of a steering wheel according to the embodiment of the present invention, which corresponds to a II-II cross-section of FIG. 1.
Figure 3:
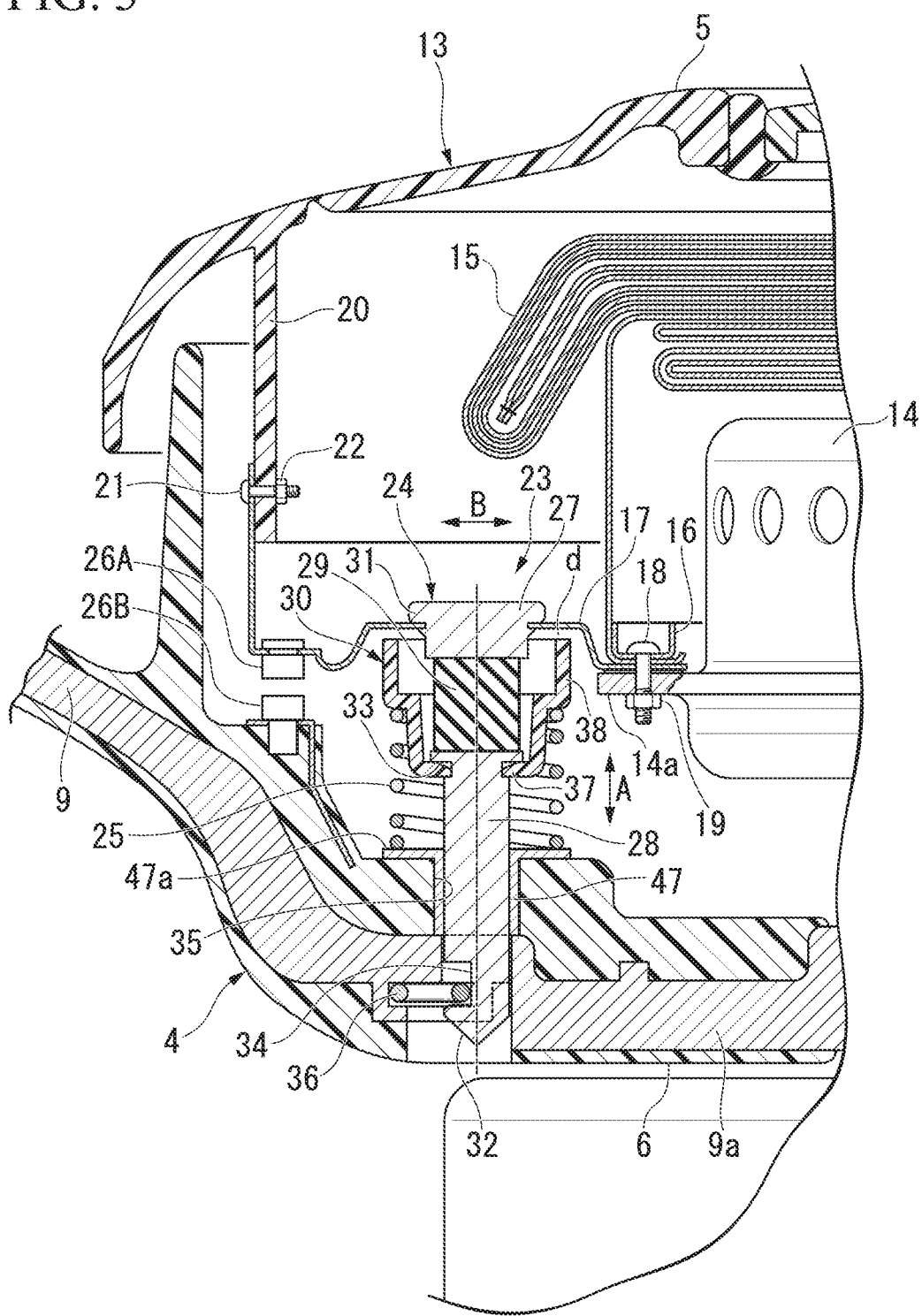
FIG. 3 is an enlarged view of a III part, in FIG. 2, of the steering wheel according to the embodiment of the present invention.

FIG. 1 is a diagram showing a driver's seat in an interior of a vehicle according to the embodiment. FIG. 2 is a cross-sectional view of a steering wheel 1 that corresponds to a II-II cross-section of the driver's seat of FIG. 1. FIG. 3 is an enlarged view of a part of FIG. 2.

As shown in these figures, in the steering wheel 1, a steering wheel main unit 4 that is held by a driver is attached to a front end of a steering shaft 3 that protrudes from an instrument panel 2 in a rearward direction on an interior side. In the steering wheel 1, a steering pad 5 as a horn operation portion is arranged in a central area of the steering wheel main unit 4.

In the following description, an axial direction means a longitudinal direction of the steering shaft 3 that is denoted with a direction of an arrow A in the figures unless otherwise specified. Similarly, orthogonal-to-axis directions mean directions orthogonal to the longitudinal direction of the steering shaft 3 that are denoted with directions of arrows B1 to B4 in the figures unless otherwise specified.

The steering wheel main unit 4 includes: a cover portion 6 at the center (see FIG. 2, FIG. 3); a plurality of spoke portions 7 that extend outwardly in a radial direction from a circumference of the cover portion 6; and an annular rim portion 8 that is linked to extension ends of the spoke portions 7. Inside each of the cover portion 6, the spoke portions 7, and the rim portion 8, a core metal 9 is buried. An external side of the core metal 9 is covered with a synthetic resin. A boss portion 9a of the core metal 9 buried in the cover portion 6 is fitted onto a front end of the steering shaft 3 and is fastened and fixed with a nut 10.

Between the cover portion 6 at the center of the steering wheel main unit 4 and the rim portion 8 on the outer circumferential side, there is provided a concave-like space 11 that recesses in a front direction of the vehicle body. In the concave-like space 11, there is arranged a horn block 13 in which an airbag module 12 and a steering pad 5 are integrated.

As shown in FIG. 2 and FIG. 3, the airbag module 12 includes: an inflator 14 that produces a high-pressure gas; an airbag 15 that is arranged behind (on the interior side of) the inflator 14 in a folded manner; and a first retainer 16 and a second retainer 17 that sandwich an opening portion of the airbag 15. While vertically sandwiched between the first retainer 16 and the second retainer 17, an opening edge of the airbag 15 is fastened and fixed together with the first and second retainers 16, 17 to a flange portion 14a on an outer circumference of the inflator 14 by means of bolts 18 and nuts 19.

A rear surface (interior-side surface) of the airbag module 12 is covered with the steering pad 5, which is the horn operation portion. On an outer circumferential edge of the steering pad 5, there is protrudingly provided a connection wall 20 toward the front side. The connection wall 20 is fastened and fixed to an outer circumferential edge of the second retainer 17 by means of bolts 21 and nuts 22. Thus, the horn block 13, which is made of the airbag module 12 and the steering pad 5 being integrated, is locked on the core metal 9 of the steering wheel main unit 4 in a floating manner, by means of three floating support portions 23.

In the case of this embodiment, the floating support portions 23 are provided: two on the left and right sides on the upper portion; and one at the center of the lower portion, with respect to the steering shaft 3 as a center. All the three have the same structure. Note that FIG. 2 shows the two floating support portions 23 on the left and right sides on the upper portion of the steering shaft 3.

The floating support portion 23 includes: an attachment pin 24 as a support block that attaches the horn block 13 to the steering wheel main unit 4 while a push-in displacement in the axial direction by the set stroke or longer for the horn block 13 is allowed; a horn spring 25 that biases the horn block 13 toward a default position; and a collar 30 that is attached integrally to the attachment pin 24 to be used as a load bypass member. The attachment pin 24 has a first end portion (end portion positioned on the rear side of the vehicle body) locked on and fixed to the second retainer 17 on the horn block 13 side, and has a second end portion (end portion positioned on the front side of the vehicle body) locked on the cover portion 6 on the steering wheel main unit 4 side in a retained state with a slight displacement in the axial direction allowed.

Furthermore to positions of the second retainer 17 on the horn block 13 side and the cover portion 6 on the steering wheel main unit 4 side that are opposed to each other in the axial direction, there are respectively attached a pair of horn contacts 26A, 26B, which are used as a horn switch. When the horn block 13 is biased by the horn spring 25 to be in the vicinity of the default position, the horn contacts 26A, 26B are in a spaced state (non-contact state). In this condition, when the horn block 13 is pushed in by the set stroke or longer, then the horn contacts 26A, 26B are brought into contact with each other, to thereby activate the horn.

Figure 4:
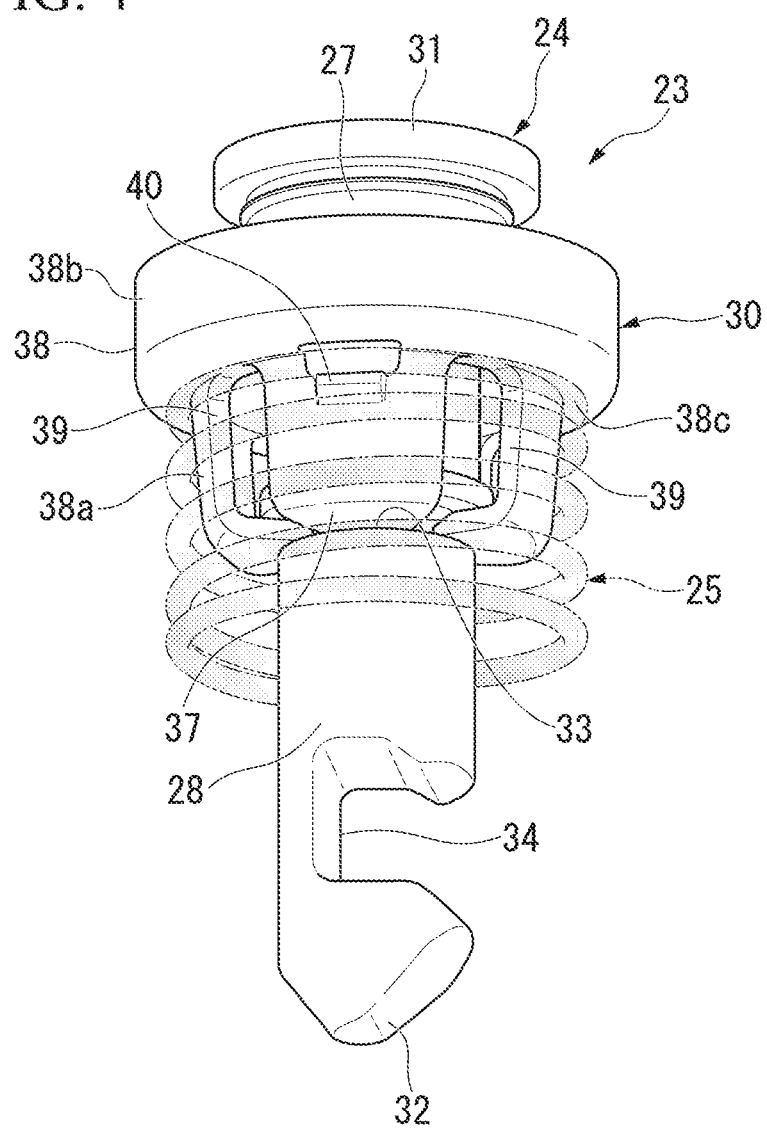
FIG. 4 is a perspective view of component parts of a floating support portion of the steering wheel according to the embodiment of the present invention.
Figure 5:
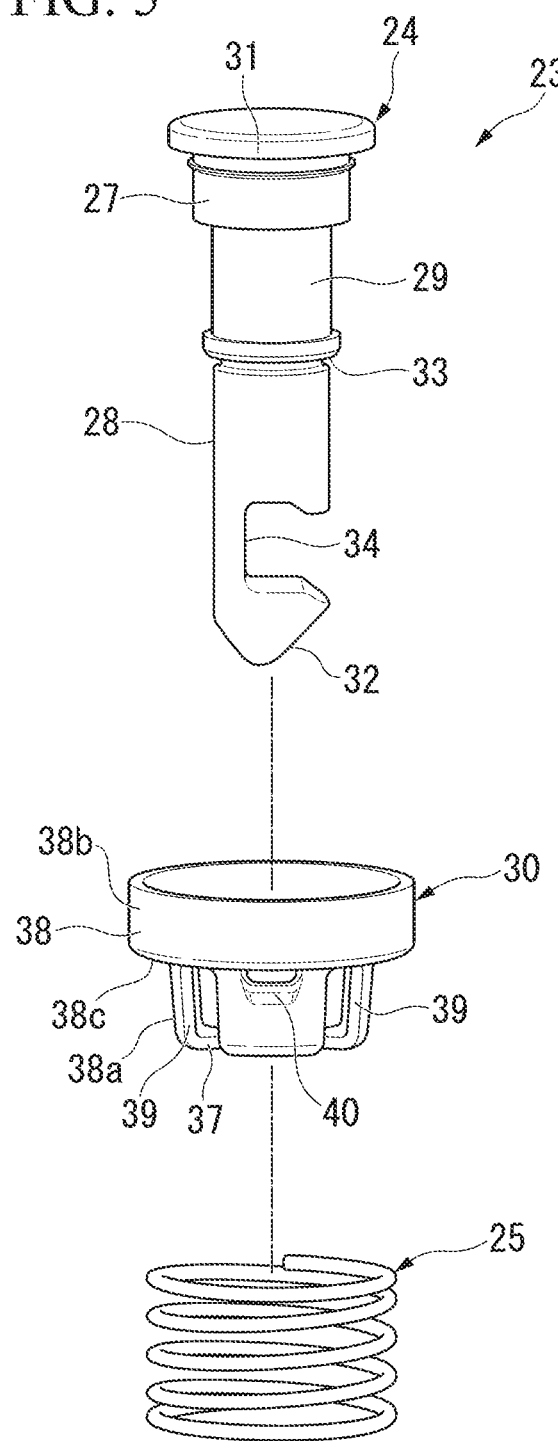
FIG. 5 is an exploded perspective view of the component parts of the floating support portion of the steering wheel according to the embodiment of the present invention.
Figure 6:
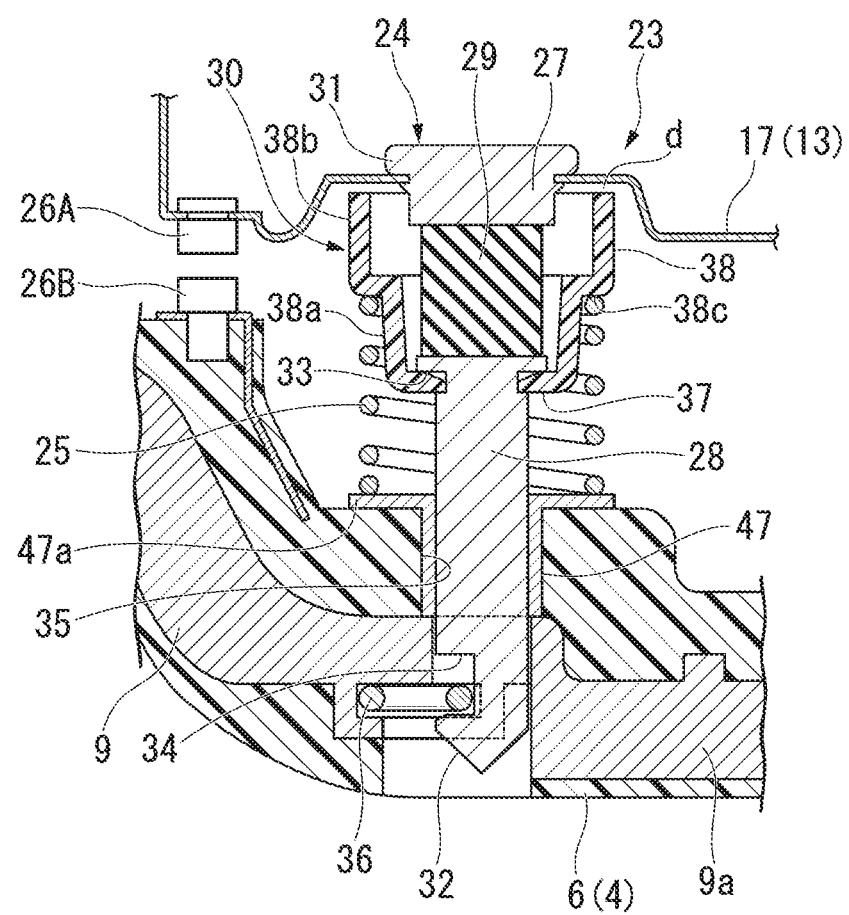
FIG. 6 is a cross-sectional view of the floating support portion of the steering wheel according to the embodiment of the present invention.

FIG. 4 and FIG. 5 are perspective views showing component parts of the floating support portion 23. FIG. 6 is a cross-sectional view showing the floating support portion 23.

As shown in these figures, the attachment pin 24 has: a first pin block 27 that is locked on and fixed to the second retainer 17 (horn block 13); a second pin block 28 (lock member) that is locked on the cover portion 6 (steering wheel main unit 4); and a circular-pillar-like rubber elastic body 29 that connects the first pin block 27 and the second pin block 28 to each other in a coaxial state. The first pin block 27 and the second pin block 28 are made of metal such as stainless steel. The rubber elastic body 29 is made of rubber such as EPDM.

The first pin block 27 is formed in a circular pillar-like shape with a short axis. On a first end portion thereof, there is formed a fixation portion 31 for being fixed to the second retainer 17 by caulking fixation or the like while to a second end portion thereof, there is joined a first end of the rubber elastic body 29 by cure adhesion or the like. Furthermore, the second pin block 28 is formed in a circular pillar-like shape with an axis longer than that of the first pin block 27. To a first end portion thereof, there is joined a second end of the rubber elastic body 29 by cure adhesion or the like while in a second end thereof, there is formed a taper portion 32 whose diameter reduces in a conical manner.

In an outer circumferential surface of the second pin block 28 at a position close to its first end portion, there is formed an annular lock groove 33 for locking and fixing the collar 30. In a portion of the outer circumference of the second pin block 28 at a position that is close to its second end portion and adjacent to an expanded-diameter side of the taper portion 32, there is formed a notch groove 34 that recesses in an orthogonal-to-axis direction. In the cover portion 6 of the steering wheel main unit 4, there is formed a support hole 35 into which the second end portion of the second pin block 28 is inserted. On an area of the front surface (surface on the front side of the vehicle body) of the cover portion 6 that surrounds the support hole 35, there is arranged a lock member 36 for which a spring steel wire is used. In the notch groove 34 of the second pin block 28 that has penetrated through the support hole 35, the lock member 36 is configured to be locked with spring elasticity. A groove width (width in a direction along the axial direction of the support hole 35) of the notch groove 34 is formed wider than an outer diameter of the lock member 36 by a set width. Therefore, a displacement of the second pin block 28 in its axial direction with respect to the cover portion 6 is allowed by a difference between the groove width of the notch groove 34 and the outer diameter of the lock member 36.

Furthermore, into the support hole 35 of the cover portion 6, a guide bushing 47 is pressed from a side that faces the concave-like space 11 (from the rear side of the vehicle body). With the guide bushing 47, the second pin block 28 is configured to be slidably guided. The guide bushing 47 has a first end of its cylindrical shaft portion provided with a flange portion 47a that extends outwardly in a radial direction. The flange portion 47a is configured to be in abutment with the opening edge of the support hole 35 of the cover portion 6 on the side facing the concave-like space 11.

The whole of the collar 30 is integrally formed from a resin material, and includes: a lock fixation portion 37 that is fixed to the lock groove 33 of the second pin block 28; and a surrounding wall 38 that surrounds a circumferential area between the rubber elastic body 29 and the first pin block 27. The surrounding wall 38 has: a small-diameter barrel portion 38a that is arranged on a second pin block 28 side; and a large-diameter barrel portion 38b that has a diameter larger than that of the small-diameter barrel portion 38a. Between the large-diameter barrel portion 38b and the small-diameter barrel portion 38a, there is provided a step surface 38c. An end of the small-diameter barrel portion 38a on the side opposite to the step surface 38c bends in a direction to reduce the diameter, and an end portion of the reduced diameter is the lock fixation portion 37. Furthermore, from the small-diameter barrel portion 38a to the lock fixation portion 37, there are provided a plurality of slits 39, which are along the axial direction, in a spaced manner in a circumferential direction. With the slits 39, the small-diameter barrel portion 38a and the lock fixation portion 37 are divided into a plurality of divided pieces. As a result of being divided into the divided pieces by the slits 39, the lock fixation portion 37 is capable of being elastically deformed in a direction to expand the diameter. When the collar 30 is fixed to the attachment pin 24, the lock fixation portion 37 elastically deforms the divided pieces in the direction to expand the diameter. Thereby, it is possible to fit a front end portion thereof into the lock groove 33 of the second pin block 28.

In a part of an outer circumferential surface of the small-diameter barrel portion 38a of the collar 30 that is close to the step surface 38c, there are formed a plurality of locking hooks 40 (spring lock portions) that protrude outwardly in the radial direction. In the case of this embodiment, two locking hooks 40 are provided at positions spaced 180° away from each other on an outer circumference of the small-diameter barrel portion 38a. In assembling the horn spring 25 onto the collar 30, when a first end portion of the horn spring 25 is pushed in beyond the locking hook 40, then the first end portion is locked and fixed between the locking hook 40 and the step surface 38c of the collar 30 (see FIG. 4).

Furthermore, an inner diameter of the large-diameter barrel portion 38b of the collar 30 is formed to have a larger diameter than a maximum outer diameter of the second pin block 28. An end surface on the opposite side to the step surface 38c of the large-diameter barrel portion 38b is an annular flat surface. The flat surface faces a front surface of the second retainer 17.

In the attachment pin 24, the fixation portion 31 of the first end of the first pin block 27 is fixed to the second retainer 17 by caulking fixation or the like. In this condition, the collar 30 is attached onto the attachment pin 24. At this time, on the collar 30, the first end of the horn spring 25 is previously locked as described above, and in this condition, the collar 30 is fitted into and fixed to the lock groove 33 in the second pin block 28. Note that when the collar 30 together with the attachment pin 24 is attached to the second retainer 17, the surrounding wall 38 of the collar 30 is arranged coaxially with the attachment pin 24 and that the flat surface of the large-diameter barrel portion 38b of the collar 30 faces the front surface of the second retainer 17 with a set gap d spaced therefrom as shown in FIG. 6.

In the case of this embodiment, the three floating support portions 23 (attachment pins 24, collars 30, and horn springs 25) are previously assembled in the horn block 13 as described above, and in this condition, the front end portion of each attachment pin 24 is inserted into the corresponding guide bushing 47 and support hole 35 on the cover portion 6 side. At this time, when the front end portion of each attachment pin 24 is insetted into the guide bushing 47 and the support hole 35, the end portion of the horn spring 25, which is locked on the collar 30, is brought into abutment with the flange portion 47a of the corresponding guide bushing 47. With push-in of the attachment pin 24 (second pin block 28), the horn spring 25 is increasingly compressed. Thus, when the attachment pin 24 is inserted into the guide bushing 47 and the support hole 35, the taper portion 32 on the front end side of the attachment pin 24 pushes and moves the lock member 36. At the time when the attachment pin 24 is inserted by a predetermined amount, the lock member 36 is elastically restored to be inserted into the notch groove 34 of the attachment pin 24. As a result, with the attachment pins 24 of the three floating support portions 23, the horn block 13 is locked on the steering wheel main unit 4.

Note that in this embodiment, the taper portion 32 and notch groove 34 of the attachment pin 24 (second pin block 28); and the lock member 36 form a snap-fit structure that locks the end portion of the attachment pin 24 on the steering wheel main unit 4.

By the way, in the aforementioned floating support portion 23, when the horn block 13 is at the default position, the end surface of the surrounding wall 38 of the collar 30 (end surface of the large-diameter barrel portion 38b) is in a non-contact state with respect to the second retainer 17 (horn block 13). Then, when the horn block 13 is pushed in by a predetermined amount, the second retainer 17 (horn block 13) is brought into abutment with the end surface of the surrounding wall 38 of the collar 30. This makes the collar 30 a load transmission path from the horn block 13 to the second pin block 28. Namely, when the horn block 13 is pushed in by a predetermined amount, the collar 30 forms a load bypass member that transmits an operation load applied to the horn block 13 to the second pin block 28 while circumventing the rubber elastic body 29.

Furthermore, in this embodiment, the horn block 13 and the rubber elastic body 29 of the attachment pin 24 forms a dynamic damper that suppresses a vibration of the steering wheel 1.

A vibrating system made of the horn block 13 and the rubber elastic body 29 is tuned so as to resonate with an engine vibration that is input to the steering wheel 1 or with a vibration in a frequency range of a travelling vibration or the like.

Next is a description of an operation of each portion when a vibration that is input to the steering wheel 1 is suppressed by the dynamic damper made of the horn block 13 and the rubber elastic body 29, and of an operation of each portion when the horn block 13 is pushed in for a horn operation.

Figure 7:
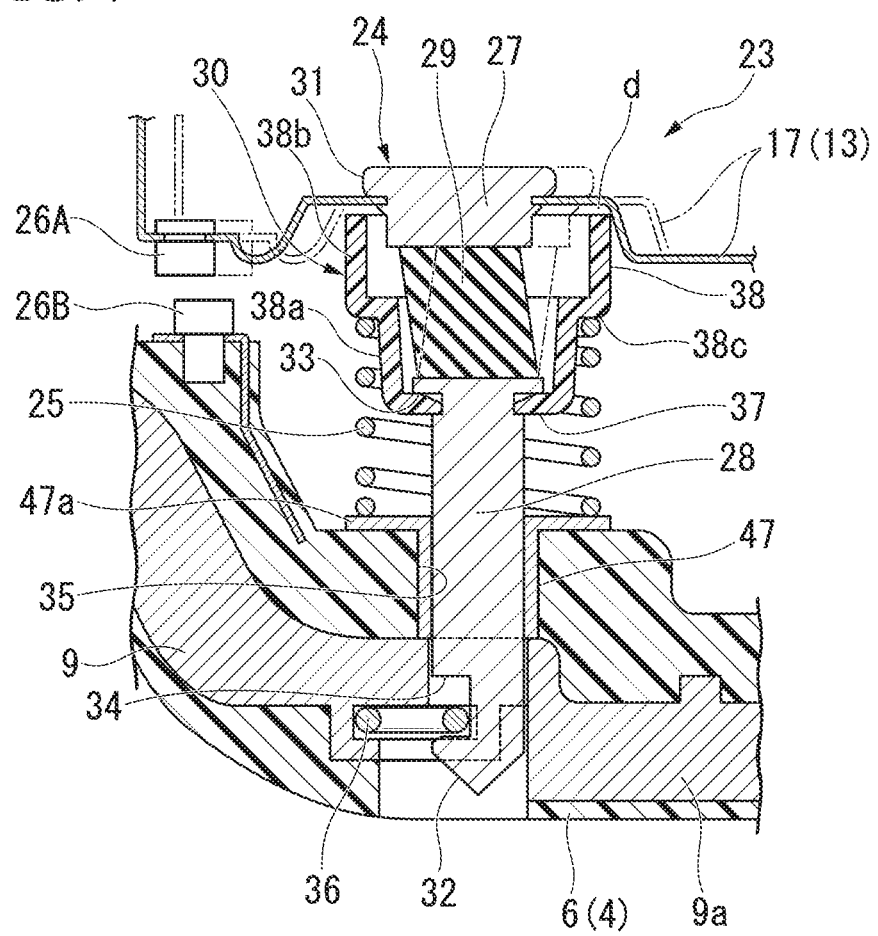
FIG. 7 is a cross-sectional view of the floating support portion of the steering wheel according to the embodiment of the present invention.
Figure 8:
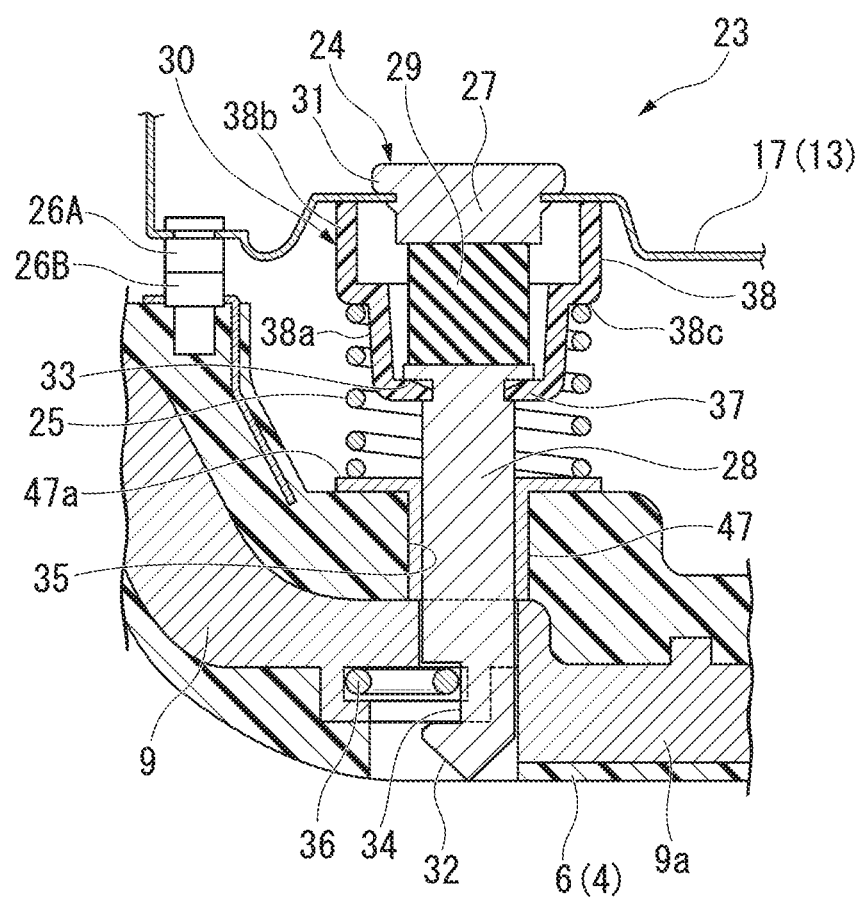
FIG. 8 is a cross-sectional view of the floating support portion of the steering wheel according to the embodiment of the present invention.

FIG. 7 is a diagram showing a behavior of the steering wheel 1 when an input vibration is suppressed by the dynamic damper. FIG. 8 is a diagram showing a behavior of the steering wheel 1 when the horn block 13 is pushed in.

As shown in FIG. 7, while the horn block 13 is not pushed in, the collar 30 of each floating support portion 23 is in a non-contact state with the horn block 13. At this time, the horn block 13 side is elastically supported so as to be displaceable to the steering wheel main unit 4 side via the rubber elastic body 29 of the attachment pin 24.

In this condition, when an engine vibration, a travelling vibration, or the like is input to the steering wheel 1, the vibration system with the horn block 13 as a damper mass and the rubber elastic body 29 as a spring resonates, which suppresses the vibration of the steering wheel 1.

Furthermore, when the horn block 13 is pushed in for a horn activation, the rubber elastic body 29 of the attachment pin 24 is slightly compressed, and subsequently, as shown in FIG. 8, the second retainer 17 of the horn block 13 is brought into abutment with the end surface of the collar 30 of the floating support portion 23. This allows a load, which is input to the horn block 13, to be transmitted to the second pin block 28 via the collar 30. Thus, when an operation load is input to the second pin block 28 via the collar 30, the second pin block 28 displaces in a cover portion 6 direction (steering wheel main unit 4 direction) while compressing the horn spring 25. Thus, when the horn block 13 is pushed in by the set stroke or longer, the horn contacts 26A, 26B are brought into contact with each other, to thereby activate the horn.

As described above, in the steering wheel structure according to this embodiment, each floating support portion 23 is provided with the collar 30 that transmits an operation load, which has been applied to the horn block 13, to the second pin block 28 while circumventing the rubber elastic body 29. The collar 30 is configured to be in a non-contact sate with the horn block 13 when the horn block 13 is at the default position, and to be brought in contact with the horn block 13 in a manner capable of transmitting a load when the horn block 13 is pushed in by a predetermined amount or greater. Therefore, it is possible to restrict an excessive load from acting on the rubber elastic body 29 at the time of a horn operation. Accordingly, in this steering wheel structure, even if the rigidity of the rubber elastic body 29 of the attachment pin 24 is set sufficiently low, it is possible to prevent a decrease in the operability of the horn and a decrease in the durability of the rubber elastic body 29. As a result, without sacrificing the operability of the horn and the durability of the rubber elastic body 29, it is possible to enhance a vibration suppression effect by the dynamic damper with ease.

Furthermore, in the steering wheel structure according to this embodiment, the collar 30 of the floating support portion 23 has: the lock fixation portion 37 that is fixed to the second pin block 28; and the surrounding wall 38 that surrounds the circumferential area between the rubber elastic body 29 and the first pin block 27. It is configured so that when the horn block 13 is pushed in by a predetermined amount or greater, the end surface of the surrounding wall 38 is brought into abutment with the horn block 13. Therefore, if with an elastic deformation of the rubber elastic body 29, the first pin block 27 is about to displace excessively in the radial direction with respect to the second pin block 28, then the first pin block 27 is brought into abutment with the surrounding wall 38 of the collar 30. As a result, an excessive displacement of the first pin block 27 in the radial direction is restricted by the collar 30. Accordingly, by adopting this structure, it is possible to prevent a decrease in the operability caused by a significant shift of the horn block 13 in an orthogonal-to-axis direction and also to prevent deterioration of the rubber elastic body 29 caused by an excessive deformation.

Furthermore, in the steering wheel structure according to this embodiment, the end surface of the surrounding wall 38 of the collar 30 is an annular flat surface. Therefore, it is possible to transmit a load in the radial direction in good balance from the horn block 13 to the collar 30. Accordingly, the operability of the horn block 13 is more favorable.

Furthermore, in the steering wheel structure according to this embodiment, the surrounding wall 38 of the collar 30 is provided with the locking hooks 40 to which the first end side of the horn spring 25 is to be attached. Therefore, while the attachment pin 24 is being attached to the steering wheel main unit 4, it is possible to lock and fix the lock fixation portion 37 of the collar 30 on and to the second pin block 28, and to previously attach the first end side of the horn spring 25 to the locking hook 40. Accordingly, it is possible to assemble the horn block 13 with the steering wheel main unit 4 with ease.

Especially, in the steering wheel structure according to this embodiment, in the second end side of the second pin block 28, the taper portion 32 and the notch groove 34 are formed. Moreover, the lock member 36, which when the second pin block 28 is inserted into the support hole 35 of the steering wheel main unit 4, is pushed and moved by the taper portion 32 of the second pin block 28 to be locked in the notch groove 34 of the second pin block 28, is provided on the steering wheel main unit 4 side. Therefore, only with the horn block 13 being positioned in the concave-like space 11 of the steering wheel main unit 4, and with the second pin block 28 of each floating support portion 23 being pushed into the corresponding support hole 35, it is possible to assemble the horn block 13 with the steering wheel main unit 4 with extreme case.

Note that the present invention is not limited to the above embodiment and that various design modifications can be made without departing from the spirit or scope thereof. For example, in the above embodiment, the collar as the load bypass member is formed in a cylindrical shape. However, so long as it is capable of transmitting a load from the horn block to the second pin block while circumventing the rubber elastic body, the load bypass member may have a shape other than a cylindrical shape.

Furthermore, the support block that causes the horn block to be supported by the steering wheel main unit may have a structure including: an attachment pin as the lock member that is locked on the steering wheel main unit side; and an elastic body that connects between the horn block side and the attachment pin so as to be elastically deformable. Moreover, the load bypass member may have a structure including a protrusion portion that is provided protrudingly on the horn block side and that is abuttable with an abutment seat on the attachment pin side, wherein when the horn block is pushed in by a predetermined amount or greater, the protrusion portion on the horn block side may be brought into abutment with the abutment seat on the attachment pin side.

In this case, to an attachment hole formed in a member on the horn block side (for example, the second retainer 17 of the above embodiment), a collar in which a rubber elastic body is joined to its interior may be attached, and an extension end of the attachment pin that is locked on the steering wheel main unit side may be joined to the rubber elastic body in the collar. At this time, an end portion of the collar may be caused to protrude to the steering wheel main unit side to be used as the aforementioned protrusion portion that is abuttable with the abutment seat on the attachment pin side. Furthermore, for the abutment seat on the attachment pin side, a retaining member with a bottomed cylindrical shape that is locked on and fixed to an outer circumferential surface of the attachment pin may be used. It is desirable that the retaining member be provided with a spring lock portion such as a locking hook on which the first end portion of the horn spring is locked.

BRIEF DESCRIPTION OF THE REFERENCE SYMBOLS

3: steering shaft
4: steering wheel main unit
5: steering pad (horn operation portion)
12: airbag module
13: horn block
24: attachment pin (support block)
25: horn spring
26A, 26B: horn contact
27: first pin block
28: second pin block (lock member)
29: rubber elastic body
30: collar (load bypass member)
37: lock fixation portion
38: surrounding wall
40: locking hook (spring lock portion)

The invention claimed is:
1. A steering wheel structure, comprising:
a steering wheel main unit that is supported by a steering shaft;
a horn block in which a horn operation portion and an airbag module are assembled;
a support block that causes the horn block to be supported by the steering wheel main unit;
horn contacts that activate a horn when the horn block is pushed in by a set stroke or longer; and
a horn spring that biases the horn block toward a default position,
the support block having: a lock member that is locked on a steering wheel main unit side in a longitudinal direction of the steering shaft; and an elastic body that is interposed between the lock member and the horn block so as to connect the horn block to the lock member in an elastically deformable manner, and
the horn spring being interposed between the steering wheel main unit and the lock member,
wherein a load bypass member is provided that transmits an operation load in a push-in direction, which has been applied to the horn block, to the lock member while circumventing the elastic body,
wherein the load bypass member is configured so as to be in a non-contact state between itself and at least either of a horn block side in the longitudinal direction of the steering shaft and a lock member side in the longitudinal direction of the steering shaft when the horn block is in a vicinity of the default position, and so as to be brought into contact with the horn block side in the longitudinal direction of the steering shaft and the lock member side in the longitudinal direction of the steering shaft in a manner capable of transmitting a load when the horn block is pushed in by a predetermined amount or greater,
wherein the support block has: a first pin block that is locked on the horn block side in the longitudinal direction of the steering shaft a second pin block as the lock member that is locked on the steering wheel main unit side in the longitudinal direction of the steering shaft and the elastic body that connects between the first pin block and the second pin block in an elastically deformable manner, and
wherein the load bypass member has: a lock fixation portion that is fixed to the second pin block; and a surrounding wall that surrounds a circumferential area between the elastic body and the first pin block, an end surface of the surrounding wall being brought into abutment with the horn block side in the longitudinal direction of the steering shaft when the horn block is pushed in by a predetermined amount or greater.

2. The steering wheel structure according to claim 1,
wherein an end surface of the surrounding wall that is brought into abutment with the horn block side in the longitudinal direction of the steering shaft is an annular flat surface.

3. The steering wheel structure according to claim 2,
wherein the load bypass member is provided with a spring lock portion to which a first end side of the horn spring is attached.

4. The steering wheel structure according to claim 3,
wherein an end portion of the first pin block that is on an opposite side to a connection portion to the elastic body is joined integrally to the horn block side in the longitudinal direction of the steering shaft, and
wherein an end portion of the second pin block that is on an opposite side to a connection portion to the elastic body is locked on the steering wheel main unit side in the longitudinal direction of the steering shaft by a snap-fit structure while a second end side of the horn spring is in abutment with the steering wheel main unit side in the longitudinal direction of the steering shaft.

5. The steering wheel structure according to claim 1,
wherein the load bypass member is provided with a spring lock portion to which a first end side of the horn spring is attached.

6. The steering wheel structure according to claim 5,
wherein an end portion of the first pin block that is on an opposite side to a connection portion to the elastic body is joined integrally to the horn block side in the longitudinal direction of the steering shaft, and
wherein an end portion of the second pin block that is on an opposite side to a connection portion to the elastic body is locked on the steering wheel main unit side in the longitudinal direction of the steering shaft by a snap-fit structure while a second end side of the horn spring is in abutment with the steering wheel main unit side in the longitudinal direction of the steering shaft.

7. The steering wheel structure according to claim 1,
wherein the support block has: an attachment pin as the lock member that is locked on the steering wheel main unit side in the longitudinal direction of the steering shaft; and the elastic body that connects between the horn block side in the longitudinal direction of the steering shaft and the attachment pin in an elastically deformable manner, and
wherein the load bypass member has a protrusion portion that is provided protrudingly on the horn block side in the longitudinal direction of the steering shaft and is abuttable with an abutment seat on an attachment pin side in the longitudinal direction of the steering shaft, the protrusion portion on the horn block side in the longitudinal direction of the steering shaft being brought into abutment with the abutment seat on the attachment pin side in the longitudinal direction of the steering shaft when the horn block is pushed in by a predetermined amount or greater.

8. The steering wheel structure according to claim 7,
wherein the load bypass member has, in an interior thereof, a barrel portion to which the elastic body is joined, and an end portion of the barrel portion on the steering wheel main unit side in the longitudinal direction of the steering shaft is the protrusion portion that is abuttable with the abutment seat on the attachment pin side in the longitudinal direction of the steering shaft, and
wherein an end portion of the attachment pin that is locked on the steering wheel main unit side in the longitudinal direction of the steering shaft is joined to the elastic body.

9. The steering wheel structure according to claim 8,
wherein the abutment seat is provided with a spring lock portion to which a first end side of the horn spring is attached.

10. The steering wheel structure according to claim 7,
wherein the abutment seat is provided with a spring lock portion to which a first end side of the horn spring is attached.

\* \* \* \* \*